US006999484B2

(12) United States Patent
Spoonhower et al.

(10) Patent No.: US 6,999,484 B2
(45) Date of Patent: Feb. 14, 2006

(54) PARALLEL ACCESS DATA STORAGE SYSTEM USING A COMBINATION OF VCSEL ARRAYS AND AN INTEGRATED SOLID IMMERSION LENS ARRAY

(75) Inventors: John P. Spoonhower, Webster, NY (US); David L. Patton, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 268 days.

(21) Appl. No.: 10/390,934

(22) Filed: Mar. 18, 2003

(65) Prior Publication Data
US 2004/0184384 A1 Sep. 23, 2004

(51) Int. Cl.
*G11B 7/135* (2006.01)
(52) U.S. Cl. ................ 372/26; 369/112.24; 369/112.26
(58) Field of Classification Search .................... 372/26
See application file for complete search history.

(56) References Cited

U.S. PATENT DOCUMENTS

| 5,081,617 | A |  | 1/1992 | Gelbart |
| 5,140,577 | A |  | 8/1992 | Ohsato |
| 5,195,152 | A |  | 3/1993 | Gupta |
| 5,272,330 | A |  | 12/1993 | Betzig et al. |
| 5,353,273 | A |  | 10/1994 | Zavislan et al. |
| 5,537,617 | A |  | 7/1996 | Zavislan et al. |
| 5,835,458 | A | * | 11/1998 | Bischel et al. ............ 369/44.12 |
| 5,881,083 | A |  | 3/1999 | Diaz-Garcia et al. |
| 6,160,828 | A |  | 12/2000 | Kozlov et al. |
| 6,194,119 | B1 |  | 2/2001 | Wolk et al. |
| 6,324,149 | B1 | * | 11/2001 | Mifune et al. .......... 369/112.01 |
| 6,498,802 | B1 | * | 12/2002 | Chu et al. ..................... 372/39 |
| 2002/0136136 | A1 |  | 9/2002 | Gelbart |

FOREIGN PATENT DOCUMENTS

EP    1 083 553 A2    3/2001

OTHER PUBLICATIONS

Imaging with Solid Immersion Lenses, Spatial Resolution, and Applications; Qiang Wu; Proceedings of the IEEE; vol. 88, No. 9; Sep. 2000.
Chapter 7-Alternative Storage Technologies; Sadik Esener and Mark Kryder.

(Continued)

Primary Examiner—James Vannucci
(74) Attorney, Agent, or Firm—Frank Pincelli

(57) ABSTRACT

A digital reading and/or writing system and method for reading and/or digital data recorded on a digital recording medium. The system includes a first array having a plurality of near-field solid immersion optical lenses and a second array having a plurality organic micro-cavity lasers with the capability of light intensity modulation. The first array being positioned with respect to the second array such that each near-field optical lens of the first array is associated with at least one organic micro-cavity laser in the second array wherein each of the plurality of organic micro-cavity lasers with the capability of light intensity modulation providing light to its associated near-field solid immersion optical lens that is used for reading digital data on the digital recording medium. An device is provided for modulation of the laser light beams and a sensor for capturing reflected light from the medium that passes through the array of near-field optics so as to obtain the digital data from the digital recording medium.

21 Claims, 11 Drawing Sheets

OTHER PUBLICATIONS

Compact, Integrated Optical Disk Readout Head Using a Novel Bistable Vertical-Cavity Surface-Emitting Laser; Hudgings et al.; IEEE Photonics Technology Letters, vol. 11, No. 2, Feb. 1999.

Jpn. J. Appl. Phys. vol. 39 (2000) pp. 1538-1541; Part 1, No. 3B, Mar. 2000; Japanese Journal of Applied Physics; Fabrication of Micro-Pyramidal Probe Array With Aperture for Near-Field Optical Memory Applications.

IEEE Journal of Quantum Electronics, vol. 25, No. 6, Jun. 1989, Design of Fabry-Perot Surface-Emitting Lasers with a Periodic Gain Structure; Corzine et al.

Applied Physics Letters; vol. 72, No. 13; Mar. 30, 1998; Semi-conducting Polymer Distributed Feedback Lasers; McGehee et al.

www.sciencemag.org; SCIENCE vol. 289; Jul. 28, 2000; Schon et al.; An Organic Solid State Injection Laser.

High Peak Brightness Polymer Light-Emitting Diodes; Tessler et al. ©WILEY-VCH Verlag GmbH. D-69469 Weinheim 1998; Advanced Materials.

Light Amplification in Organic Thin Films Using Cascade Energy Transfer; Berggren et al. Bell Laboratories, Lucent Technologies.

Applied Physics Letters; vol. 74, No. 19; May 10, 1999; Pulsed Excitation of Low-mobility Light-Emitting Diodes; Implication for Organic Lasers; Tessler et al.

Journal of Applied Physics; vol. 84, No. 8; Oct. 15, 1998; Study of Lasing Action Based On Forster Energy Transfer in Optically Pumped Organic Semi-Conductor Thin Films; Kozlov et al.

Electronic Letters; Mar. 16, 1995; vol. 31, No. 6; 2/5 Gbit/s 100m Data Transmission Using Graded-Index Polymer Optical Fiber and High-Speed Laser Diode at 640nm Wavelength; Ishigure et al.

Vertical-Cavity Surface Emitting Lasers; Design, Fabrication, Characterization, and Applications; Wilmsen et al.; 1999.

Vertical-Cavity Surface Emitting Lasers: Moving from Research to Manufacturing; Choquette et al.; Proceedings of the IEEE. vol. 85, No. 11; Nov. 1997.

Circular Buried Heterostructure (CBH) GaAlAs/GaAs Surface Emitting Lasers; Kinoshita et al. 1987 IEEE.

Organic Solid-State Lasers; Rep. Prog. Phys. 63(2000) 729-762; Kranzelbinder et al.

* cited by examiner

PARALLEL ACCESS DATA STORAGE SYSTEM USING A COMBINATION OF VCSEL ARRAYS AND AN INTEGRATED SOLID IMMERSION LENS ARRAY

FIELD OF THE INVENTION

This invention relates to an article, system and method used for reading and writing multiple digitally recorded tracks on a data storage medium using a solid immersion lens array and an organic micro-cavity laser array.

BACKGROUND OF THE INVENTION

Recent advances in optics provide for a method of exposure of materials on a length scale much smaller than previously realized. Such near-field optical methods are realized by placing an aperture or a lens in close proximity to the surface of the sample or material to be exposed. Special methods for positioning control of the aperture or lens are required, as the distance between the optical elements (aperture or lens) and the material surface is extremely small. Betzig and Trautman in U.S. Pat. No. 5,272,330 reported on the use of tapered optical fibers as a means of providing exposures in extremely small areas; exposures of the size of 10 nm in area are now relatively commonplace. In this case, the fiber tip position is maintained to be within some nanometers (typically 10–50) of the target surface. Others (see, for example, the review by Q. Wu, L. Ghislain, and V. B. Elings, Proc. IEEE (2000), 88(9), pgs. 1491–1498) have developed means of exposure by the use of the solid immersion lens (SIL). The SIL is positioned within approximately 0.3 micrometer of the target surface by the use of special nano-positioning technology as in the case of the tapered optical fiber. In the case of the SIL, marks on a data storage medium can be produced much smaller than the size achievable through the use of conventional or classical optics. Such conventional optics are said to be diffraction-limited because the size of the smallest feature in an image is limited by physical diffraction. Exposures produced by means of the SIL or other near-field optical methods can be much smaller in spatial extent than those produced by conventional optical systems and still be readable. Near-field optics has been used to create single marks in recording medium with such reduced spatial extent. With smaller marks on a data storage system, the resulting density of stored information is correspondingly higher.

Vertical cavity surface emitting lasers (VCSELs) based on inorganic semiconductors (e.g. AlGaAs) have been developed since the mid-80's (K. Kinoshita et al., IEEE J. Quant. Electron. QE-23, 882 [1987]). They have reached the point where AlGaAs-based VCSELs emitting at 850 nm are manufactured by a number of companies and have lifetimes beyond 100 years (K. D. Choquette et al., Proc. IEEE 85, 1730 [1997]). With the success of these near-infrared lasers, attention in recent years has turned to other inorganic material systems to produce VCSELs emitting in the visible wavelength range (C. Wilmsen et al., *Vertical-Cavity Surface-Emitting Lasers*, Cambridge University Press, Cambridge, 2001). There are many potential applications for visible lasers, such as, display, optical storage reading/writing, laser printing, and short-haul telecommunications employing plastic optical fibers (T. Ishigure et al., Electron. Lett. 31, 467 [1995]). In spite of the worldwide efforts of many industrial and academic laboratories, much work remains to be done to create viable laser diodes (either edge emitters or VCSELs) that produce light output that spans the visible spectrum.

In an effort to produce visible wavelength VCSELs it would be advantageous to abandon inorganic-based systems and focus on organic-based laser systems, since organic-based gain materials can enjoy a number of advantages over inorganic-based gain materials in the visible spectrum. For example, typical organic-based gain materials have the properties of low unpumped scattering/absorption losses and high quantum efficiencies. In comparison to inorganic laser systems, organic lasers are relatively inexpensive to manufacture, can be made to emit over the entire visible range, can be scaled to arbitrary size and, most importantly, are able to emit multiple wavelengths (such as red, green, and blue) from a single chip. Finally, organic lasers have a very large gain bandwidth, especially in comparison with inorganic lasers. Over the past number of years, there has been increasing interest in making organic-based solid-state lasers. The laser gain material has been either polymeric or small molecule and a number of different resonant cavity structures were employed, such as, micro-cavity (Kozlov et al., U.S. Pat. No. 6,160,828), wave guide, ring microlasers, and distributed feedback (see also, for instance, G. Kranzelbinder et al., Rep. Prog. Phys. 63, 729 (2000) and M. Diaz-Garcia et al., U.S. Pat. No. 5,881,083). A problem with all of these structures is that in order to achieve lasing it was necessary to excite the cavities by optical pumping using another laser source. It is much preferred to electrically pump the laser cavities since this generally results in more compact and easier to modulate structures.

A main barrier to achieving electrically pumped organic lasers is the small carrier mobility of organic material, which is typically on the order of $10^{-5}$ cm$^2$/(V–s). This low carrier mobility results in a number of problems. Devices with low carrier mobilities are typically restricted to using thin layers in order to avoid large voltage drops and ohmic heating. These thin layers result in the lasing mode penetrating into the lossy cathode and anode, which causes a large increase in the lasing threshold (V. G. Kozlov et al., J. Appl. Phys. 84, 4096 (1998)). Since electron-hole recombination in organic materials is governed by Langevin recombination (whose rate scales as the carrier mobility), low carrier mobilities result in orders of magnitude more charge carriers than singlet excitons; one of the consequences of this is that charge-induced (polaron) absorption can become a significant loss mechanism (N. Tessler et al., Appl. Phys. Lett. 74, 2764 (1999)). Assuming laser devices have a 5% internal quantum efficiency, using the lowest reported lasing threshold to date of ~100 W/cm$^2$ (M. Berggren et al., Nature 389, 466 (1997)), and ignoring the above mentioned loss mechanisms, would put a lower limit on the electrically-pumped lasing threshold of 1000 A/cm$^2$. Including these loss mechanisms would place the lasing threshold well above 1000 A/cm$^2$, which to date is the highest reported current density, which can be supported by organic devices (N. Tessler, Adv. Mater. 19, 64 (1998)).

One way to avoid these difficulties is to use crystalline organic material instead of amorphous organic material as the lasing media. This approach was recently taken (J. H. Schon, Science 289, 599 (2000)) where a Fabry-Perot resonator was constructed using single crystal tetracene as the gain material. By using crystalline tetracene, larger current densities can be obtained, thicker layers can be employed (since the carrier mobilities are on the order of 2 cm$^2$/(V–s)), and polaron absorption is much lower. Using crystal tetracene as the gain material resulted in room temperature laser threshold current densities of approximately 1500 A/cm$^2$.

An alternative to electrical pumping for organic lasers is optical pumping by incoherent light sources, such as, light emitting diodes (LEDs), either inorganic (M. D. McGehee et al. Appl. Phys. Lett. 72, 1536 [1998]) or organic (Berggren et al., U.S. Pat. No. 5,881,089). This possibility is the result of unpumped organic laser systems having greatly reduced combined scattering and absorption losses (~0.5 cm$^{-1}$) at the lasing wavelength, especially when one employs a host-dopant combination as the active media. Even taking advantage of these small losses, the smallest reported optically pumped threshold for organic lasers to date is 100 W/cm$^2$ based on a wave guide laser design (M. Berggren et al., Nature 389, 466 (1997)). Since off-the-shelf inorganic LEDs can only provide up to ~20 W/cm$^2$ of power density, it is necessary to take a different route to avail of optically pumping by incoherent sources. Additionally, in order to lower the lasing threshold it is necessary to choose a laser structure that minimizes the gain volume; a VCSEL-based micro-cavity laser satisfies this criterion. Using VCSEL-based organic laser cavities should enable optically pumped power density thresholds below 5 W/cm$^2$. As a result practical organic laser devices can be driven by optically pumping with a variety of readily available, incoherent light sources, such as LEDs.

There are a few disadvantages to organic-based gain media, but with careful laser system design these can be overcome. Organic materials can suffer from low optical and thermal damage thresholds. Devices will have a limited pump power density in order to preclude irreversible damage to the device. Organic materials additionally are sensitive to a variety of environmental factors, like oxygen and water vapor. Efforts to reduce sensitivity to these variables typically result in increased device lifetime.

One of the advantages of organic-based lasers is that since the gain material is typically amorphous, devices can be formed inexpensively when compared to lasers with gain materials that require a high degree of crystallinity (either inorganic or organic materials). Additionally, lasers based upon organic amorphous gain materials can be fabricated over large areas without regard to producing large regions of single crystalline material; as a result they can be scaled to arbitrary size resulting in greater output powers. Because of their amorphous nature, organic-based lasers can be grown on a wide variety of substrates; thus, materials such as glass, flexible plastics, and Si are possible supports for these devices. Thus, there can be significant cost advantages as well as a greater choice in usable support materials for amorphous organic-based lasers.

A problem of the prior art data storage is that it relies on a single-track method for creating and retrieving the data and hence has limited access times. Multi-channel means for optical recording using arrays of laser have been proposed to overcome the single channel access limitation. Gupta, in U.S. Pat. No. 5,195,152, describes an apparatus for recording onto and reading from an optical data storage disk with an array of diode lasers. Channel wave guides are used to deliver light from the array of diode laser sources to an optical imaging system. Light from the edge-emitting diodes is coupled to each individual channel wave guide. A multi-channel read system with channel wave guides bringing the signal light reflected from the storage medium to a plurality of detectors is also described. A system for tracking and focus control is included in this apparatus. Zavislan et. al. further describe a multi-channel optical head and data storage system in two separate U.S. Pat. Nos. 5,353,273 and 5,537,617. The multi-channel optical head is employed as part of data read system; the multi-channel optical system is described as an integrated optical read-channel fabricated on a planar wave guide structure. All such systems require the precision alignment of the array of edge-emitting diode laser sources with respect to the planar wave guide structure.

VSCELS are well suited for multi-channel optical head and data storage systems as the multiple laser sources can be patterned onto a single chip and because the light is emitted normal to the chip surface with high beam quality. This facilitates the alignment and delivery of the laser read/write light beam through the optical system and onto the recording medium surface. Gelbart describes such a system in U.S. Patent Application Publication 2002/0136136 A1. In this publication a semiconductor VCSEL array is used to illuminate an optical recording medium for data reading or writing. Conventional optical system components are described in this publication, such as micro-lens arrays used in combination with the linear VCSEL array. Furthermore, width modulation of the written data marks on the surface of the data storage medium is proposed as a means to increase data storage density. This system and other systems read or write data marks on the storage medium whose size is limited by optical diffraction as mentioned above. Near-field optical methods offer the opportunity to achieve smaller marks sizes and thereby even higher optical data storage densities. Furthermore, the use of organic micro-cavity lasers or organic VCSELs enables multi-wavelength systems to be fabricated at low cost

SUMMARY OF THE INVENTION

In accordance with one aspect of the present invention there is provided a digital reader system for reading digital data recorded on a digital recording medium, comprising:

a first array having a plurality of near-field solid immersion optical lenses;

a second array having a plurality organic micro-cavity lasers with the capability of light intensity modulation, the first array being positioned with respect to the second array such that each near-field optical lens of the first array is associated with at least one organic micro-cavity laser in the second array, each of the plurality of organic micro-cavity lasers with the capability of light intensity modulation providing light to its associated near-field solid immersion optical lens that is used for reading digital data on the digital recording medium;

an apparatus for modulation of the laser light beams; and a sensor for capturing reflected light from the medium that passes through the array of near-field optics so as to obtain the digital data from the digital recording medium.

In accordance with another aspect of the present invention there is provided a digital writer for writing digital data on a digital recording medium, comprising:

a first array having a plurality of near-field solid immersion optical lenses;

a second array having a plurality organic micro-cavity lasers with the capability of light intensity modulation, the first array being positioned with respect to the second array such that each near-field optical lens of the first array is associated with at least one micro-cavity laser in the second array, each of said plurality of organic micro-cavity lasers providing light to its associated near-field optical lens that is used for writing digital data on the digital recording medium;

an apparatus for modulation of the laser light beams; and
a sensor for capturing reflected light from the medium that passes through the array of near-field optics so as to obtain tracking and focusing information from the digital recording medium.

In accordance with still another aspect of the present invention there is provided a method for writing digital data on a digital recording medium, comprising the steps of:

providing a first array having a plurality of near-field solid immersion optical lenses;

providing a second array having a plurality of organic micro-cavity lasers, the first array being positioned with respect to the second array such that each near-field optical lens of the first array is associated with at least one of the plurality of micro-cavity lasers in the second array so that light emitting from the organic micro-cavity lasers will pass through its the associated near-field solid immersion optical lens for writing on the digital recording medium.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

This invention combines an array of organic vertical cavity lasers or equivalently, organic micro-cavity lasers and an array of solid immersion lenses to enable the writing and reading of parallel multiple data streams on the surface of an digital recording medium. This would enable faster access to data and higher read/write rates at high capacities.

Figure 1:
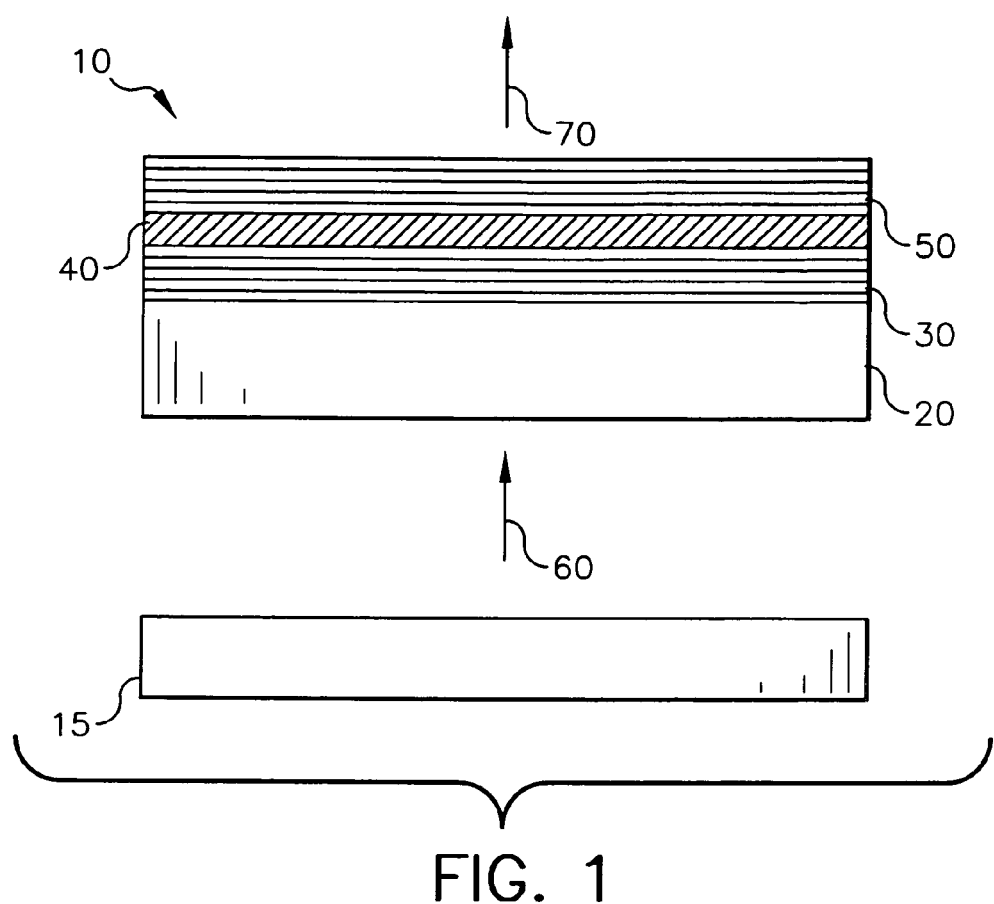
FIG. 1 is a cross-section side view schematic of an optically pumped organic laser cavity device.

A schematic of an organic vertical cavity laser device 10 is shown in FIG. 1. The substrate 20 can either be light transmissive or opaque, depending on the intended direction of optical pumping and laser emission. Light transmissive substrates 20 may be transparent glass, plastic, or other transparent materials such as sapphire. Alternatively, opaque substrates including, but not limited to, semiconductor material (e.g. silicon) or ceramic material may be used in the case where both optical pumping and emission occur through the same surface. On the substrate 20 is deposited a bottom dielectric stack 30 followed by an organic active region 40. A top dielectric stack 50 is then deposited. A pump beam 60 optically pumps the vertical cavity organic laser device 10. The source 15 of the pump beam 60 may be incoherent light, such as emission from a light-emitting diode (LED). Alternatively, the pump beam 60 may originate from a coherent laser source. It is important to note that the light intensity modulation of the laser emission 70 is accomplished by modulating the intensity of the pump beam 60. Thus means for producing light intensity modulation are considered to be a part of the source 15. FIG. 1 shows laser emission 70 from the top dielectric stack 50.

The preferred material for the organic active region 40 is a small-molecular weight organic host-dopant combination typically deposited by high-vacuum thermal evaporation. These host-dopant combinations are advantageous since they result in very small unpumped scattering/absorption losses for the gain medium. It is preferred that the organic molecules be of small molecular weight since vacuum deposited materials can be deposited more uniformly than spin-coated polymeric materials. It is also preferred that the host materials used in the present invention are selected such that they have sufficient absorption of the pump beam 60 and are able to transfer a large percentage of their excitation energy to a dopant material via Förster energy transfer. Those skilled in the art are familiar with the concept of Förster energy transfer, which involves a radiationless transfer of energy between the host and dopant molecules. An example of a useful host-dopant combination for red-emitting lasers is aluminum tris(8-hydroxyquinoline) (Alq) as the host and [4-(dicyanomethylene)-2-t-butyl-6-(1,1,7,7-tetramethyljulolidyl-9-enyl)-4H-pyran] (DCJTB) as the dopant (at a volume fraction of 1%). Other host-dopant combinations can be used for other wavelength emissions. For example, in the green a useful combination is Alq as the host and [10-(2-benzothiazolyl)-2,3,6,7-tetrahydro-1,1,7,7-tetramethyl-1H,5H,11H-[1]Benzopyrano[6,7,8-ij]quinolizin-11-one] (C545T) as the dopant (at a volume fraction of 0.5%). Other organic gain region materials can be polymeric substances, e.g., polyphenylenevinylene derivatives, dialkoxy-polyphenylenevinylenes, poly-para-phenylene derivatives, and polyfluorene derivatives, as taught by Wolk et al. in commonly assigned U.S. Pat. No. 6,194,119 B1, issued Feb. 27, 2001, and referenced herein. It is the purpose of the organic active region 40 to receive transmitted pump beam light 60 and emit laser light.

The bottom and top dielectric stacks 30 and 50, respectively, are preferably deposited by conventional electron-beam deposition and can comprise alternating high index and low index dielectric materials, such as, $TiO_2$ and $SiO_2$, respectively. Other materials, such as $Ta_2O_5$ for the high index layers, could be used. The bottom dielectric stack 30 is deposited at a temperature of approximately 240° C. During the top dielectric stack 50 deposition process, the temperature is maintained at around 70° C. to avoid melting the organic active materials. In an alternative embodiment of the present invention, the top dielectric stack is replaced by the deposition of a reflective metal mirror layer. Typical metals are silver or aluminum, which have reflectivities in excess of 90%. In this alternative embodiment, both the pump beam 60 and the laser emission 70 would proceed through the substrate 20. Both the bottom dielectric stack 30 and the top dielectric stack 50 are reflective to laser light over a predetermined range of wavelengths, in accordance with the desired emission wavelength of the laser cavity 10.

Figure 2:
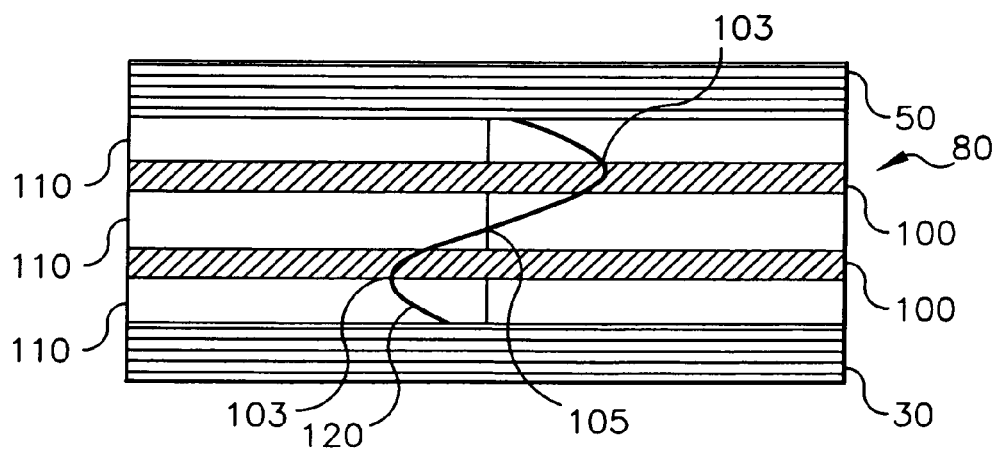
FIG. 2 is a cross-section side view schematic of an optically pumped organic-based vertical cavity laser with a periodically structured organic gain region.

The efficiency of the laser is improved further using an active region design as depicted in FIG. 2 for the organic vertical cavity laser device 80. The organic active region 40 (shown in FIG. 1) includes one or more periodic gain regions 100 and organic spacer layers 110 (shown in FIG. 2) disposed on either side of the periodic gain regions 100 and arranged so that the periodic gain regions 100 are aligned with antinodes 103 of the device's standing wave electromagnetic field pattern 120. This is illustrated in FIG. 2 where the laser's standing electromagnetic field pattern 120 in the organic active region 40 is schematically drawn. Since stimulated emission is highest at the antinodes 103 and negligible at nodes 105 of the electromagnetic field, it is inherently advantageous to form the active region 40 as shown in FIG. 2. The organic spacer layers 110 do not undergo stimulated or spontaneous emission and largely do not absorb either the laser emission 70 or the pump beam 60 wavelengths. An example of a spacer layer 110 is the organic material 1,1-Bis-(4-bis(4-methyl-phenyl)-amino-phenyl)-cyclohexane (TAPC). TAPC works well as the spacer material since it largely does not absorb either the laser emission 70 or the pump beam 60 energy and, in addition, its refractive index is slightly lower than that of most organic host materials. This refractive index difference is useful since it helps in maximizing the overlap between the electromagnetic field antinodes and the periodic gain region(s) 100. As will be discussed below with reference to the present invention, employing periodic gain region(s) 100 instead of a bulk gain region results in higher power conversion efficiencies and a significant reduction of the unwanted spontaneous emission. The placement of the periodic gain region(s) 100 is determined by using the standard matrix method of optics (Corzine et al. IEEE Journal of Quantum Electronics, Volume 25, No. 6, June 1989). To get good results, the thicknesses of the periodic gain region(s) 100 need to be at or below 50 nm in order to avoid unwanted spontaneous emission.

Figure 3:
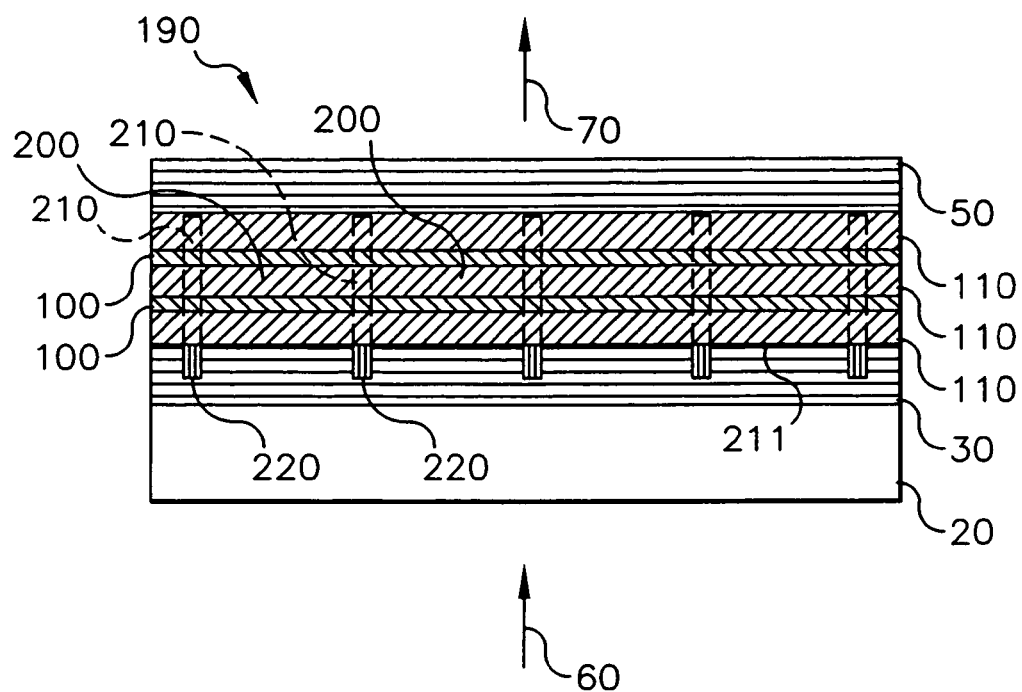
FIG. 3 is a cross-section side view schematic of an optically pumped two-dimensional phase-locked organic vertical cavity laser array device.

The laser can be increased in area while maintaining a degree of spatial coherence by utilizing the phase-locked organic laser array device 190 as depicted in FIG. 3. In order to form a two-dimensional phase-locked organic laser array device 190, organic laser cavity devices 200 separated by inter-pixel regions 210 need to be defined on the surface of the VCSEL. To obtain phase locking, intensity and phase information must be exchanged amongst the organic laser cavity devices 200. This is best obtained by weakly confining the laser emissions to the device regions by either small amounts of built-in index or gain guiding, e.g. by modulating the reflectance of one of the mirrors. In a preferred embodiment the reflectance modulation was affected by patterning and forming an etched region 220 in the bottom dielectric stack 30, using standard photolithographic and etching techniques, thus forming a two-dimensional array of circular pillars 211 on the surface of the bottom dielectric stack 30. The remainder of the organic laser micro-cavity device structure is deposited upon the patterned bottom dielectric stack 30 as described above. In a preferred embodiment, the shape of the laser pixels is circular; however, other pixel shapes are possible, such as rectangular, for example. The inter-pixel spacing is in the range of 0.25 to 4 μm. Phase-locked array operation also occurs for larger inter-pixel spacings, however, it leads to inefficient usage of the optical-pumping energy. The etch depth is preferred to be from 200 to 1000 nm deep to form etched region 220. By etching just beyond an odd number of layers into the bottom dielectric stack 30, it is possible to affect a significant shift of the longitudinal mode wavelength in the etched region away from the peak of the gain medium. Hence, lasing action is prevented and spontaneous emission is significantly reduced in the inter-pixel regions 210. The end result of the formation of etched region 220 is that the laser emission is weakly confined to the organic laser cavity devices 200, no lasing originates from the inter-pixel regions 210, and coherent phase-locked laser light is emitted by the phase-locked organic laser array device 190.

Figure 4:
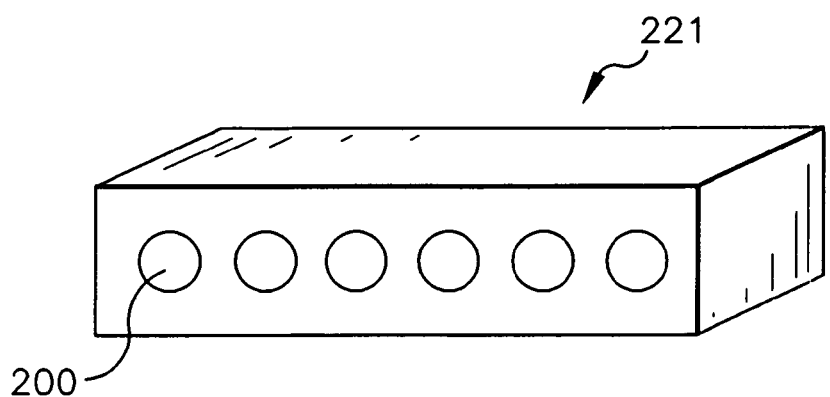
FIG. 4 shows an organic laser cavity structure made in accordance with the present invention in which a one-dimensional arrangement of organic laser cavity devices is depicted.

An organic laser cavity structure is a predetermined arrangement of a plurality of organic laser cavity devices 200. FIG. 4 shows a one-dimensional organic laser cavity structure 221. The one-dimensional organic laser cavity structure has a linear arrangement of the organic laser cavity devices 200. It is to be understood that the organic laser cavity devices 200 that comprise elements of the structure can be a variety of shapes, e.g., rectangular, triagonal, etc. other than the circular shapes depicted. The individual organic laser cavity devices 200 could be comprised of phase-locked organic laser array devices 190.

Figure 5:
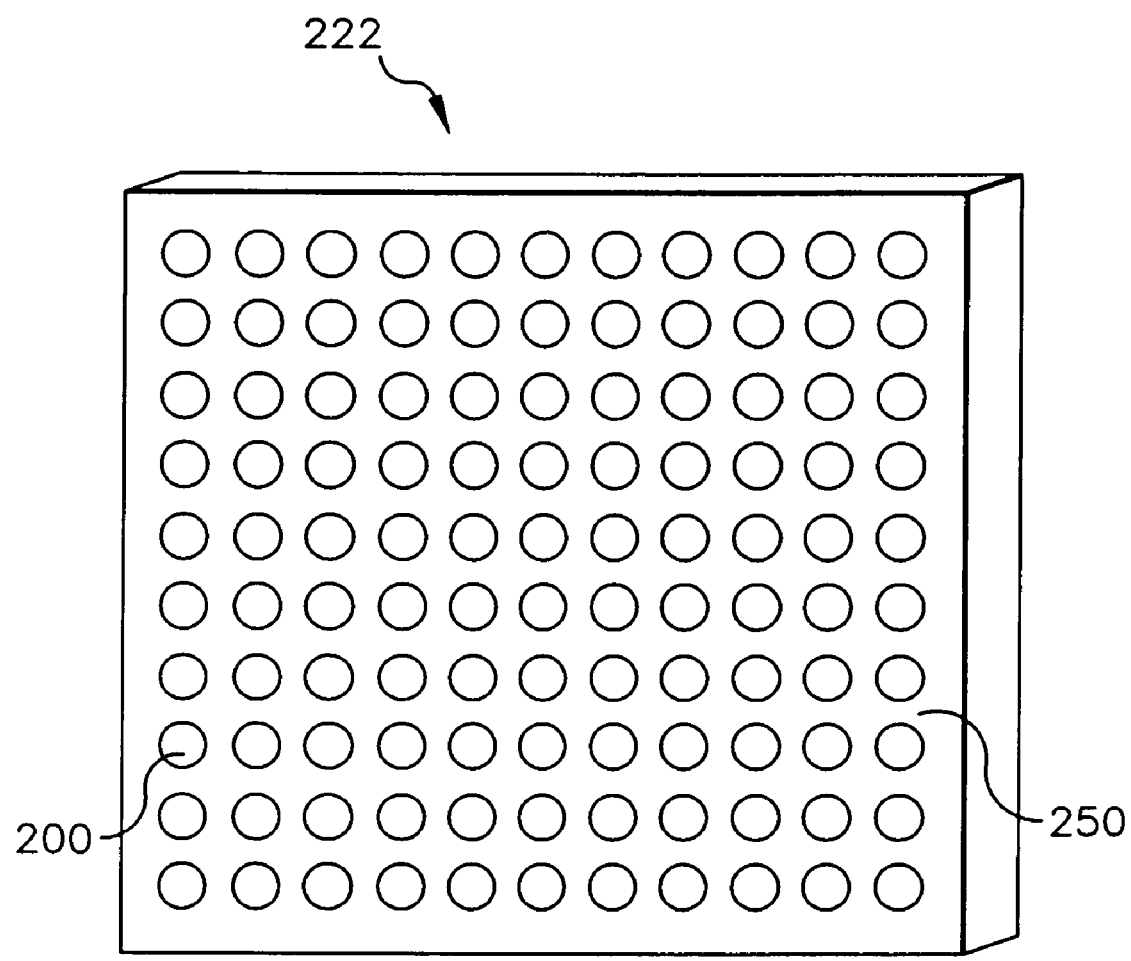
FIG. 5 shows an organic laser cavity structure made in accordance with the present invention in which a two-dimensional arrangement of organic laser cavity devices is depicted.

FIG. 5 shows an organic laser cavity structure made in accordance with the present invention in which a two-dimensional arrangement of organic laser cavity devices 200 is depicted. Such a two-dimensional organic laser cavity structure 222 is formed by fabricating organic laser cavity devices 200 in a regular pattern that extends in 2 dimensions. Fabrication of such devices is well known to those who are skilled in the art. The inter-pixel regions 250 generally consist of non-lasing portions of the structure that separate the organic laser cavity devices 200.

Figure 6:
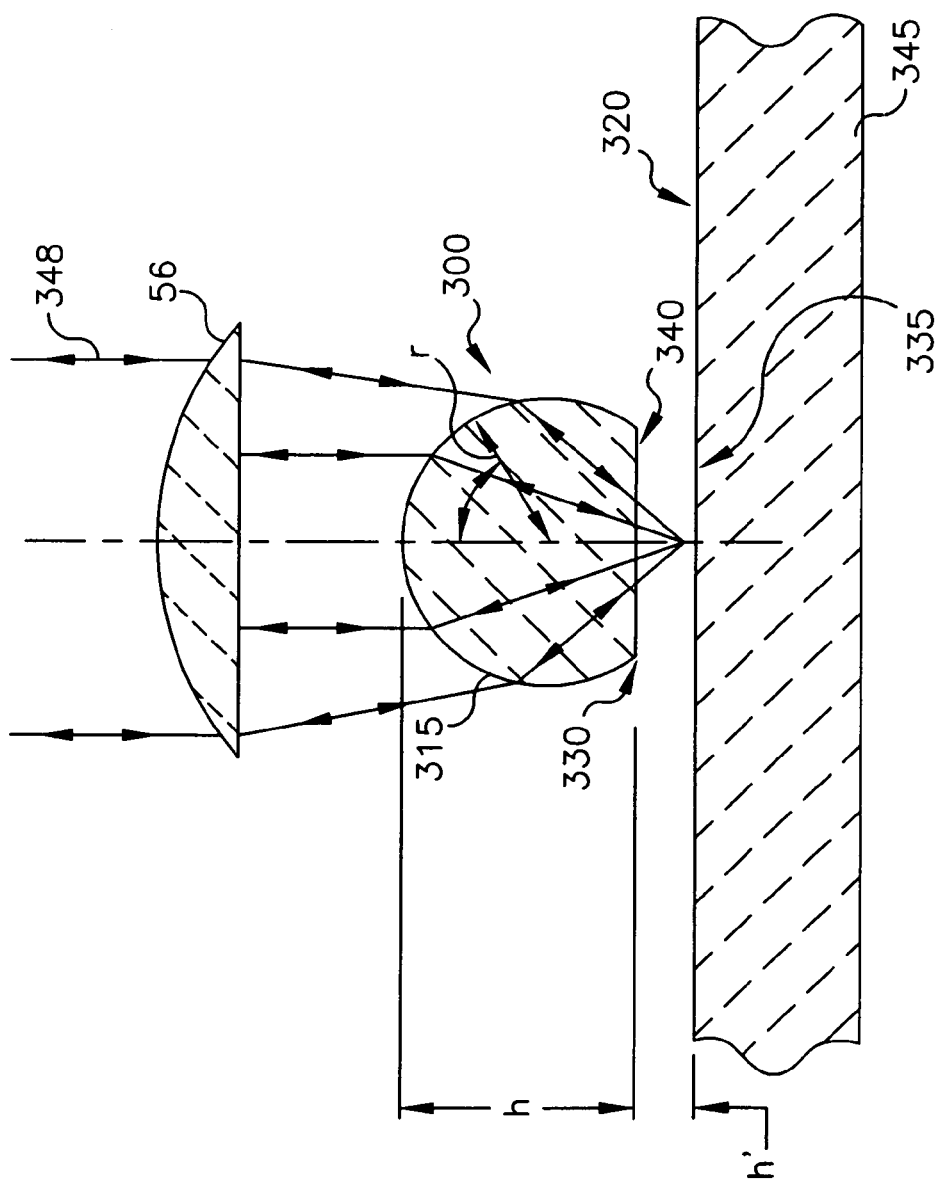
FIG. 6 illustrates a schematic cross-sectional view of a single solid immersion lens structure made in accordance with the present art.

Referring to FIG. 6, there is illustrated a cross-sectional view of a solid immersion optical lens (SIL) 300 made in accordance with the present art, with indications of the parameters used to describe the structure and operation. A solid immersion lens portion 315 comprises a truncated sphere of radius r and an index of refraction $n_s$. An objective lens 56 of conventional design is used to deliver the light onto a solid immersion optical lens (SIL) 300. It is disposed at a highest height h above a bottom surface 340 so that a boundary margin 330 is formed which is narrower in diameter than the diameter of the lens (2r) portion 315. A read/write region 335 is provided at a distance h' between the surface 320 and the bottom surface 340. The region 335 comprises the illuminated area at the top surface 320 of a medium 345 which is h' below the bottom surface 340 of the solid immersion optical lens 300. The distance h' is given by the relation:

$$h' = r + (r/n_s) - h.$$

where
r is the radius of the sphere,
h is the height of the solid immersion lens portion 315
$n_s$ is the index of refraction of the material that forms the solid immersion lens portion 315.

Figure 7:
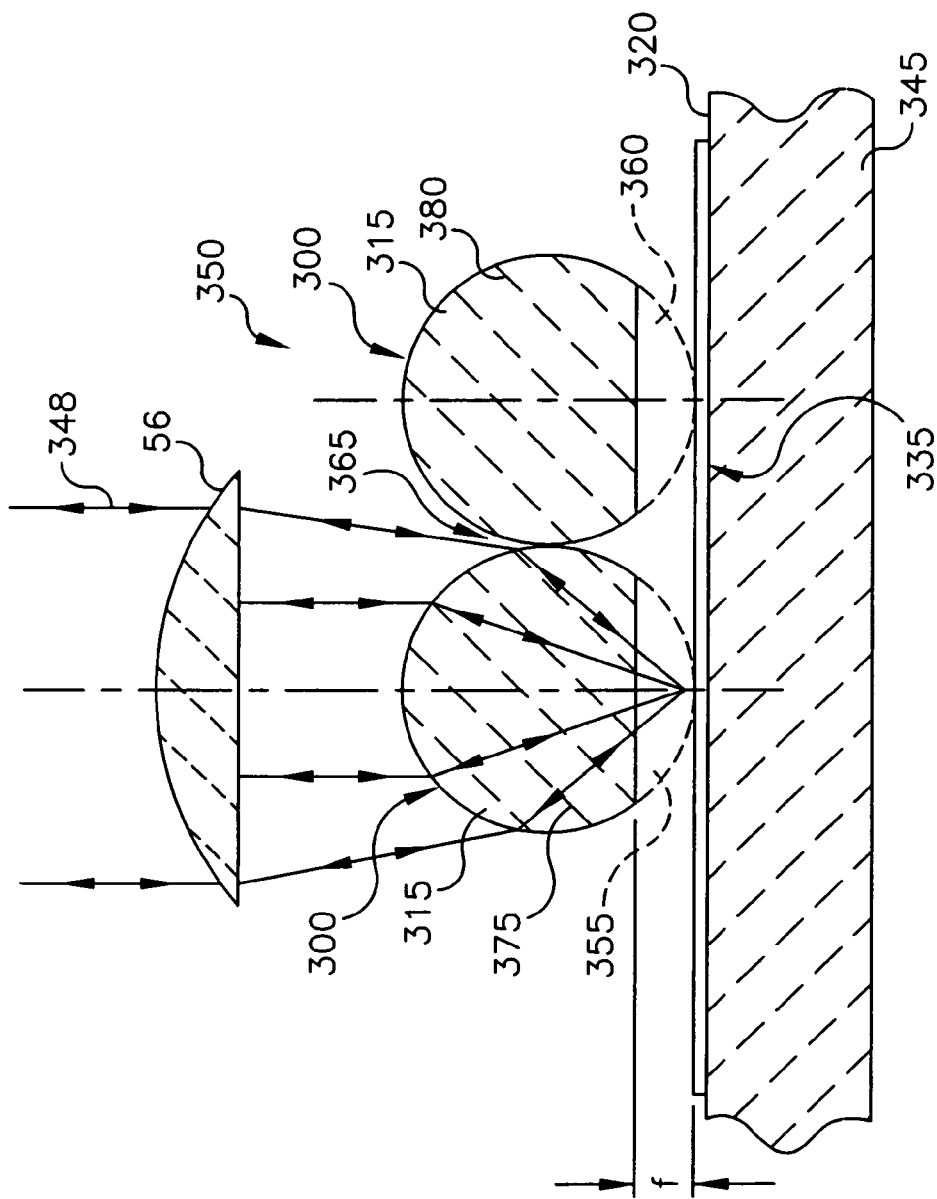
FIG. 7 illustrates a schematic cross-sectional view of a solid immersion lens array made in accordance with the present invention.

A method for producing a SIL is disclosed in U.S. Pat. No. 6,301,055. Optical rays 348 passing through the system are shown in FIG. 6 Referring to FIG. 7, there is illustrated a cross-sectional view of a solid immersion lens array 350 made in accordance with the present invention. The present embodiment describes a plurality of solid immersion optical lenses 300 integrally formed with the body portion 315 to form the solid immersion lens array 350. In this particular embodiment the solid immersion lens array 350 is made by placing glass spheres 355 and 360 in a fixed position with their edges touching. The spheres 355 and 360 are rigidly attached to each other by via a connecting member 365. The connecting member 365 can be formed using an adhesive such as OP29 manufactured by the Dymax Corporation. Optical performance of the elements of the array is related to the index of refraction $n_s$ of the material forming the lens. The ability of the lens to reduce spot size as noted above, is inversely proportional to $n_s$; therefore it is highly desirable to work with lens materials with large indices of refraction. Commonly used glasses for lens manufacture range in index of refraction from about 1.49 to 1.85. However there are specialty glasses with much higher indices. Plastic materials tend to have low indices of refraction, therefore they are less desirable for SIL manufacture. Thus it is desirable that the index of refraction be equal to or greater than 1.49 for the SIL array. The SIL array is completed by grinding a flat surface 340 on the connected spheres 355 and 360. forming SIL 375 and SIL 380. The method of grinding a flat on a glass sphere is well known to those skilled in the art. Another method for creating a solid immersion lens array is described in patent application Ser. No. 10/171,168. The type of material used to form the solid immersion lens array 350 depends on various parameters. The method disclosed in U.S. Pat. No. 6,301,055 for molding a single SIL lists suitable materials as low temperature of formation polymers, room temperature vulcanization elastomers, low temperature of formation epoxies, polyimides, polycarbonates, and photo resists, or pliant silicone elastomers. In both methods an read/write region 335 is provided at critical distance f; as is well known to those skilled in the art. The read/write region 335 comprises the area at the distance f, for example 0.5 micrometers below bottom surface 340 of the SIL and the top surface 320 of a medium 345. Data to be read or written is placed in the read/write region 335 as is well known to those skilled in the art.

Figure 8:
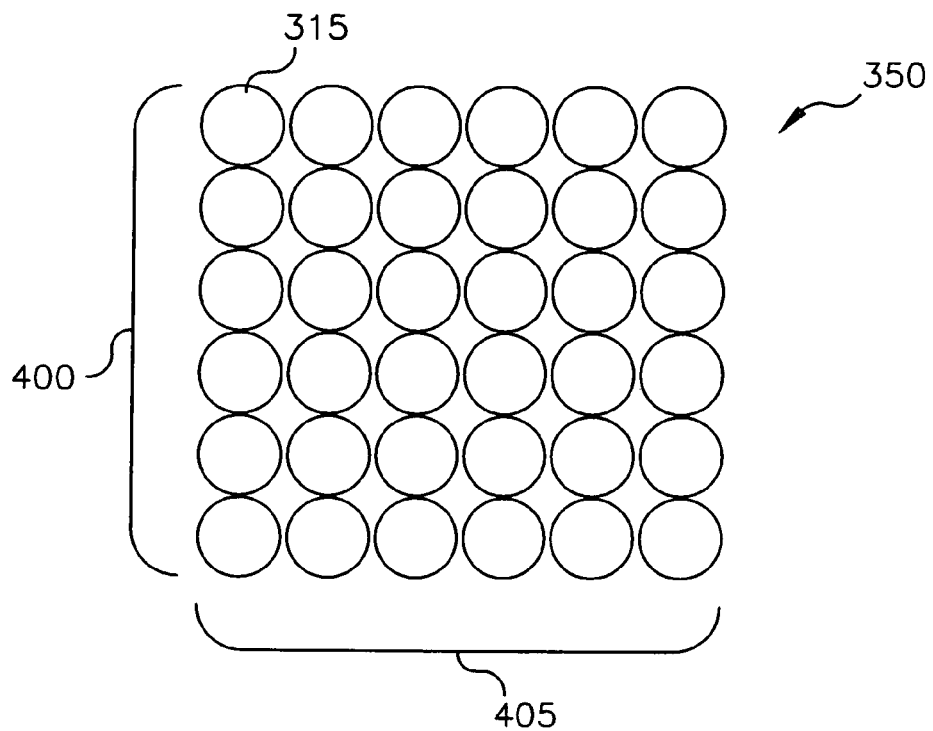
FIG. 8 is a schematic top plan view of a solid immersion lens array made in accordance with the present invention.

FIG. 8 illustrates a top view of a solid immersion lens array 350 formed by molding a plurality of solid immersion lens portion 315 of the solid immersion optical lens 300 in a fixed position to one another made in accordance with the present invention. As previously discussed in FIGS. 6 and 7 like numerals indicate like parts and operations. Multiple columns 400 and rows 405 of SIL 300 can be created using the techniques described previously. The number and spacing of the solid immersion lens portion 315 can be made to suit the type of data, which is to be written or read.

Figure 9:
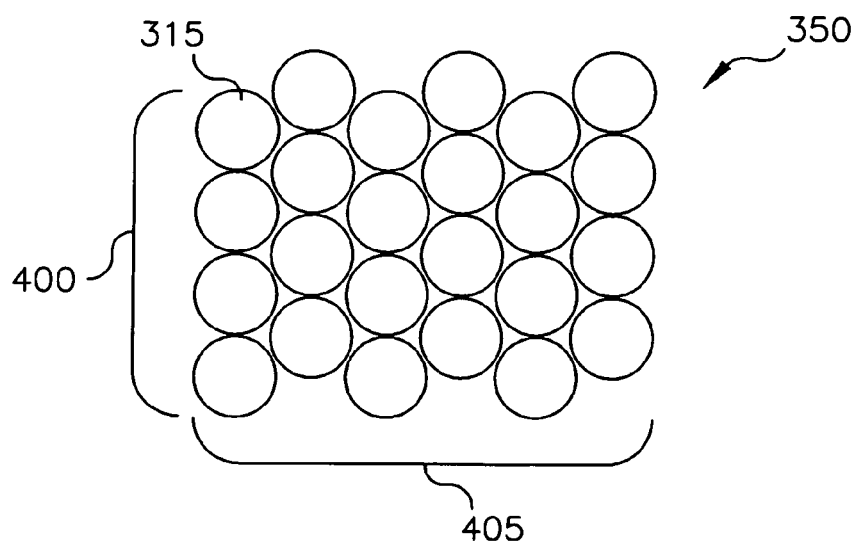
FIG. 9 is a schematic top plan view of another configuration of a solid immersion lens array made in accordance with the present invention.

FIG. 9 illustrates a top view of another configuration the solid immersion lens array 350 made in accordance with the present invention. As previously discussed in FIGS. 6 and 7 like numerals indicate like parts and operations. In this case, a close-packed array of spherical components is shown.

Figure 10:
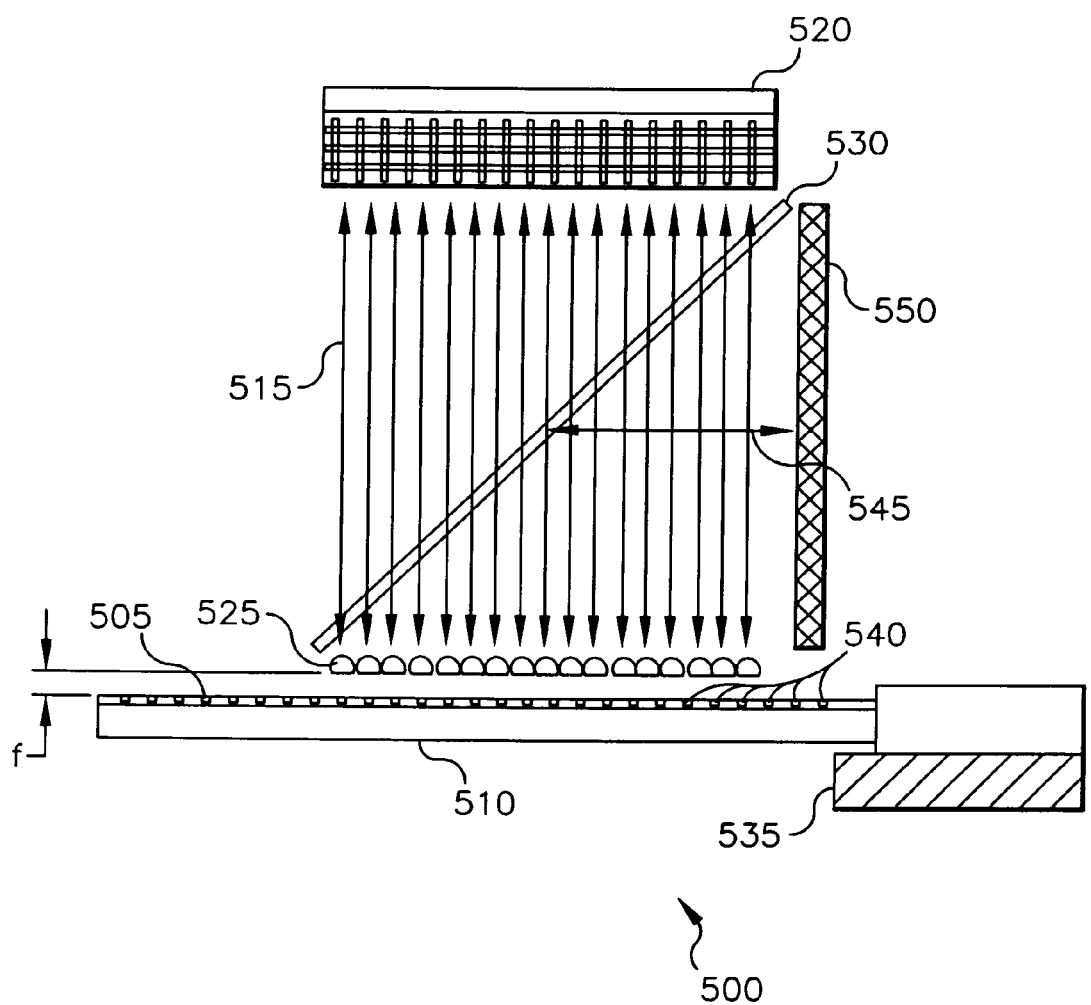
FIG. 10 is a schematic view of an apparatus for forming the multiple track digital record on the medium using an array of vertical cavity lasers and an array of solid immersion lenses made in accordance with the present invention.

Referring now to FIG. 10, there is illustrated an optical array head 500 for writing and reading multiple tracks of data marks 505 on medium 510. In the writing mode the data marks 505 are formed on the medium 510 by focusing light 515 from a organic laser cavity structure 520 through a solid immersion lens array 525 onto the medium 510. The light 515 from the organic laser cavity structure 520 passes through a beam splitter 530 and is focused through a solid immersion lens (SIL) array 525. The medium 510 resting on a stage 535 is placed within a critical distance f. European Patent No. 1083553 provides an example of the means to position an SIL at the appropriate distance from the recording surface, which is incorporated by reference herein. Such a positioning device could be a flying head as is used in hard disk storage devices. Alternately there are many known in the art as nano or micro positioning technologies. There are a variety of mechanisms for focus and tracking control for the illumination from the organic laser cavity structure 520 onto the medium 510. Gupta in U.S. Pat. No. 5,195,152 describes a method wherein the reflected light from one organic vertical cavity laser device 80 is phase-shifted and added to the light emitted from an additional laser source. The combined beam illuminates a grating and subsequently imaged onto a detector array to provide tracking and focus signals. Alternatively, Gelbart in U.S. Pat. No. 5,081,617 describes an optical apparatus where a line image of a diode laser source simultaneously illuminates multiple tracks on the recording medium. The reflected light signals from multiple tracks are imaged onto a detector array and processed for tracking and focus signal determination. Finally, Ohsato in U.S. Pat. No. 5,140,577 describes a system with multiple light beams illuminating multiple tracks simultaneously, and wherein each detector sensor element in the detector array is in fact bifurcated in order to produce a pair of output signals for each sensor element. The subsequent processing of these signals produces tracking and focus information, as well as reading the data stream for the system.

In the reading mode the data marks 505 are read from the data tracks 540 on the medium 510 by focusing light 515 from organic laser cavity structure 520 through a solid immersion lens array 525 onto the tracks 540. The reflected light beam 545 passes through a beam splitter 530 and is focused onto a sensor 550 such as a CCD, CMOS, etc.

Figure 11:
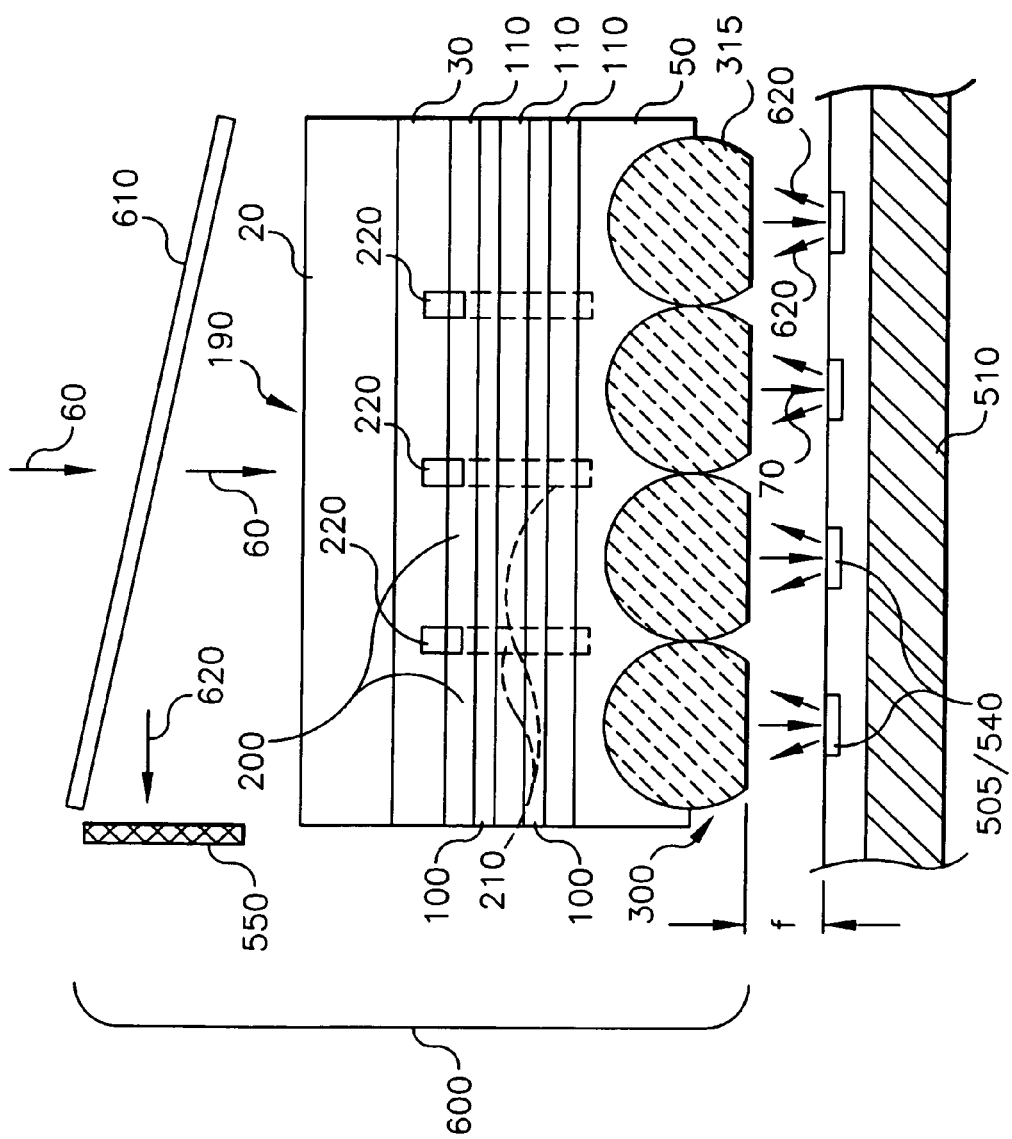
FIG. 11 is a cross-section side view schematic of an optically pumped two-dimensional organic vertical cavity laser array formed on a solid immersion lens array device made in accordance with the present invention.

Referring now to FIG. 11 a cross-section side view schematic of an alternative optical array head 600 based upon an optically pumped two-dimensional organic laser cavity structure formed on a solid immersion lens array device and made in accordance with the present invention. As previously discussed in FIGS. 3 and 7 like numerals indicate like parts and operations. The optical array head 600 comprises the two-dimensional array organic laser array device 190 integrated with the solid immersion lens array 350 (comprised of a plurality of SIL 300), optical beamsplitter 610, and sensor 550. In this embodiment, the spacing between the organic laser cavity devices 200 is such that phase-locking does not occur; the individual organic laser cavity devices 200 act as an array of independent laser devices, even though they are optically pumped by a common intensity modulated source. Light in the form of the pump beam 60 passes through a beamsplitter and optically excites a two-dimensional organic laser cavity structure 520. It should be noted that to have different data streams read from or written by the optical array head 600, the light sources 15 for each organic laser cavity device must be independently intensity modulated. Laser emission 70 illuminates the surface of a data storage medium, either producing or reading data marks 505 in the data tracks 540. In this embodiment, an alternative medium 510 is fabricated from fluorescent material, so that when illuminated with laser emission 70 at an optical wavelength within the fluorescence excitation spectrum, produces emitted light 620 at substantially different optical wavelengths than the laser emission 70. With the proper design of the bottom and top dielectric stacks, 30 and 50 respectively, the organic lasers cavity devices 200 can be made to be transmissive to the emitted light 620 wavelengths. This emitted light 620 reflects from the beamsplitter 610 and impinges upon the sensor 550.

Figure 12:
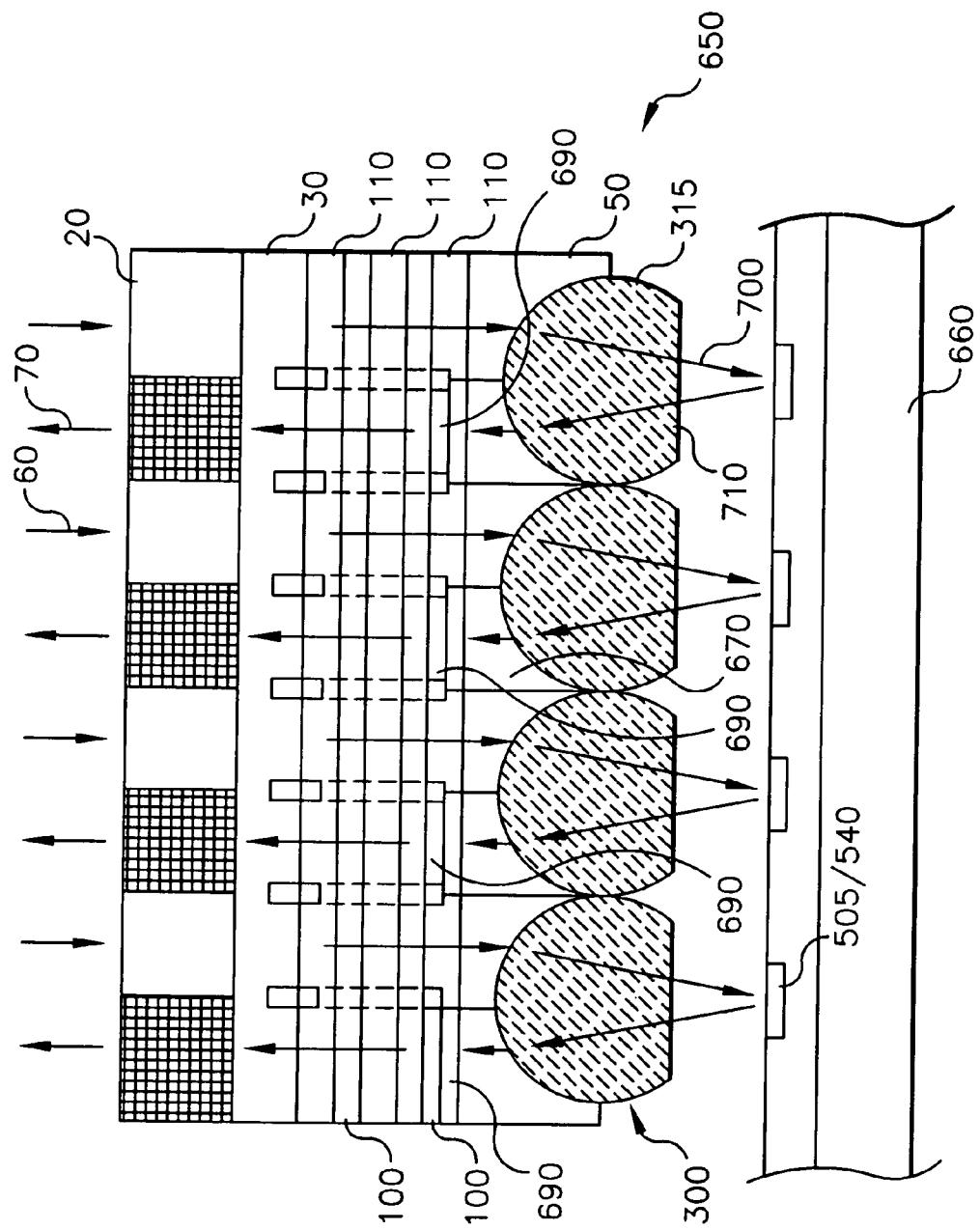
FIG. 12 is a cross-section side view schematic of another embodiment of an optically pumped two-dimensional organic vertical cavity laser array formed on a solid immersion lens array device made in accordance with the present invention.

FIG. 12 is a cross-section side view schematic of another embodiment of an optically pumped two-dimensional organic vertical cavity laser array formed on a solid immersion lens array device made in accordance with the present invention. In this case, multiple laser cavity structures are associated with each individual element of the solid immersion lens array. A dual laser device array optical head subsystem 650 is depicted in FIG. 12. For each solid immersion lens portion 315, two organic vertical cavity laser devices send or receive light to a single solid immersion lens portion 315. One such organic vertical cavity laser is depicted to the right of FIG. 12. A substrate 20 of glass has deposited upon it the bottom dielectric stack 30, an organic active region comprised of organic spacer layers 110 and periodic gain regions 100, and a top dielectric stack 50 integrated to the solid immersion lens portion. The pump beam 60 excites laser action through the substrate 20. Laser emission 700 from this organic vertical cavity laser device is imaged by the solid immersion lens portion 315 onto the medium 660 to produce a data mark 505 or read an existing data mark 505. The data marks are located in data tracks 540 as in previous embodiments. This first organic vertical cavity laser may be optimized by its design to receive blue (e.g. 405 nm) pump beam 60 and produce a green (530 nm) laser emission 700. The reflected laser light 710 passes through the same solid immersion lens portion 315 and also through a modified top dielectric stack 670, this stack being designed to pass the green 530 nm wavelength reflected from the medium 660. A filter 690 removes residual pump light and allows the green 530 nm light to excite a second organic vertical cavity laser device and produce laser emission 70 at a third wavelength perhaps a red light at 660 nm. The substrate 20 may be modified to preclude the pump beam from exciting the second organic vertical cavity laser; this could for example entail the removal of the 405 nm light by filtering. Many other arrangements of the laser wavelengths and designs are possible and are considered within the scope of this invention. For example, the optical head subsystem 650 may be configured to have two different wavelengths illuminating the medium 660.

Figure 13:
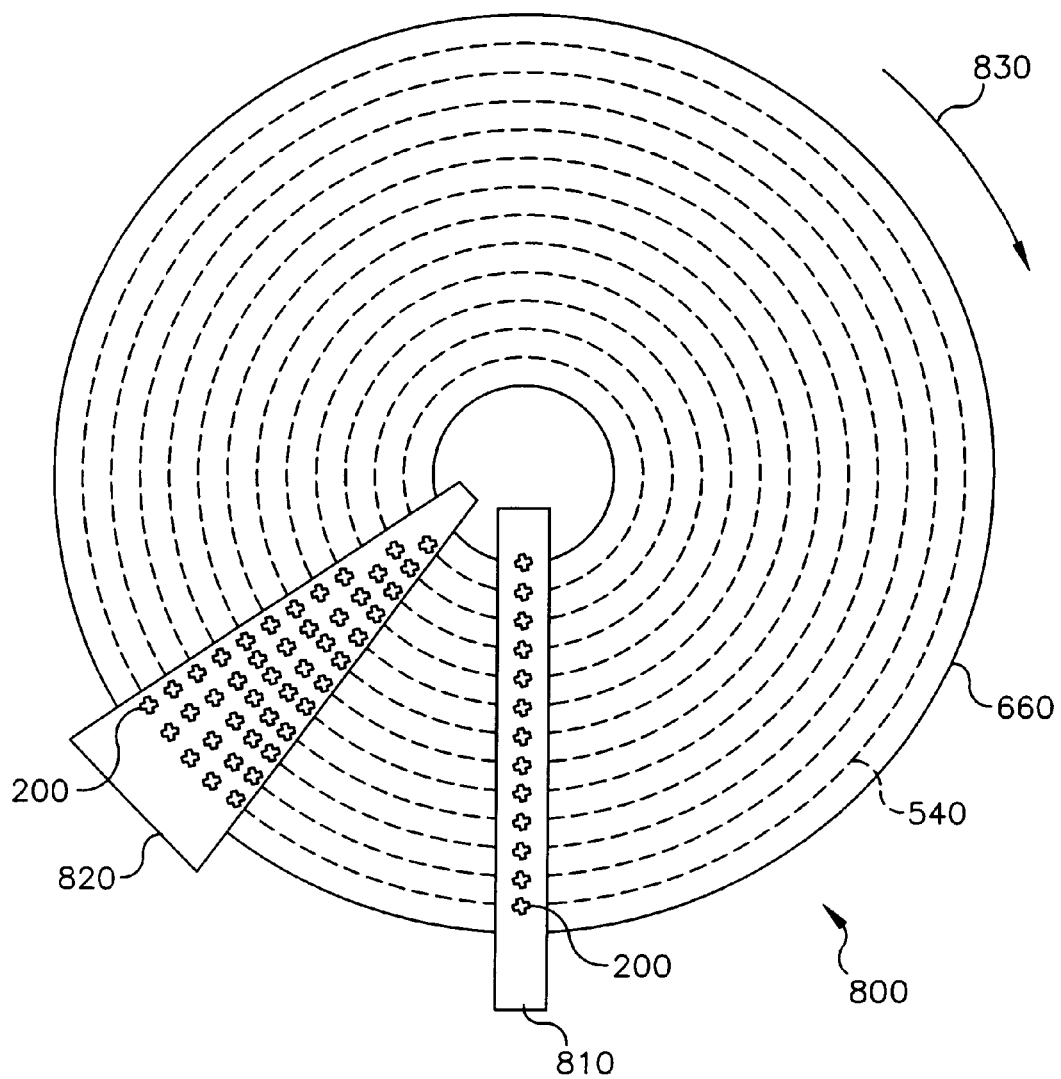
FIG. 13 is a schematic top plan view of multi-channel read/write optical head and medium made in accordance with the present invention.

FIG. 13 is a schematic top plan view of multi-channel read/write optical array head and medium 660 made in accordance with the present invention. A multi-head system 800 is depicted with both a linear optical array head 810, and a two-dimensional optical array head 820 shown in the drawing. The arrow 830 depicts the rotation direction for the medium 660 with data tracks 540. The linear optical array head 810 might be a write head while the two-dimensional optical array head 820 is a read head. The two-dimensional optical array head 820 would offer high speed read capability as a plurality of organic laser cavity devices 200 are available to read at the outer radius of the medium where the tangential velocity of the data track 540 is higher that at an inner radius. The solid immersion lens arrays, optical beam splitters, and sensors are not shown for purposes of clarity in this figure. Of course other component arrangements are possible and may be advantaged in other applications where different system parameters are to be optimized.

Figure 14:
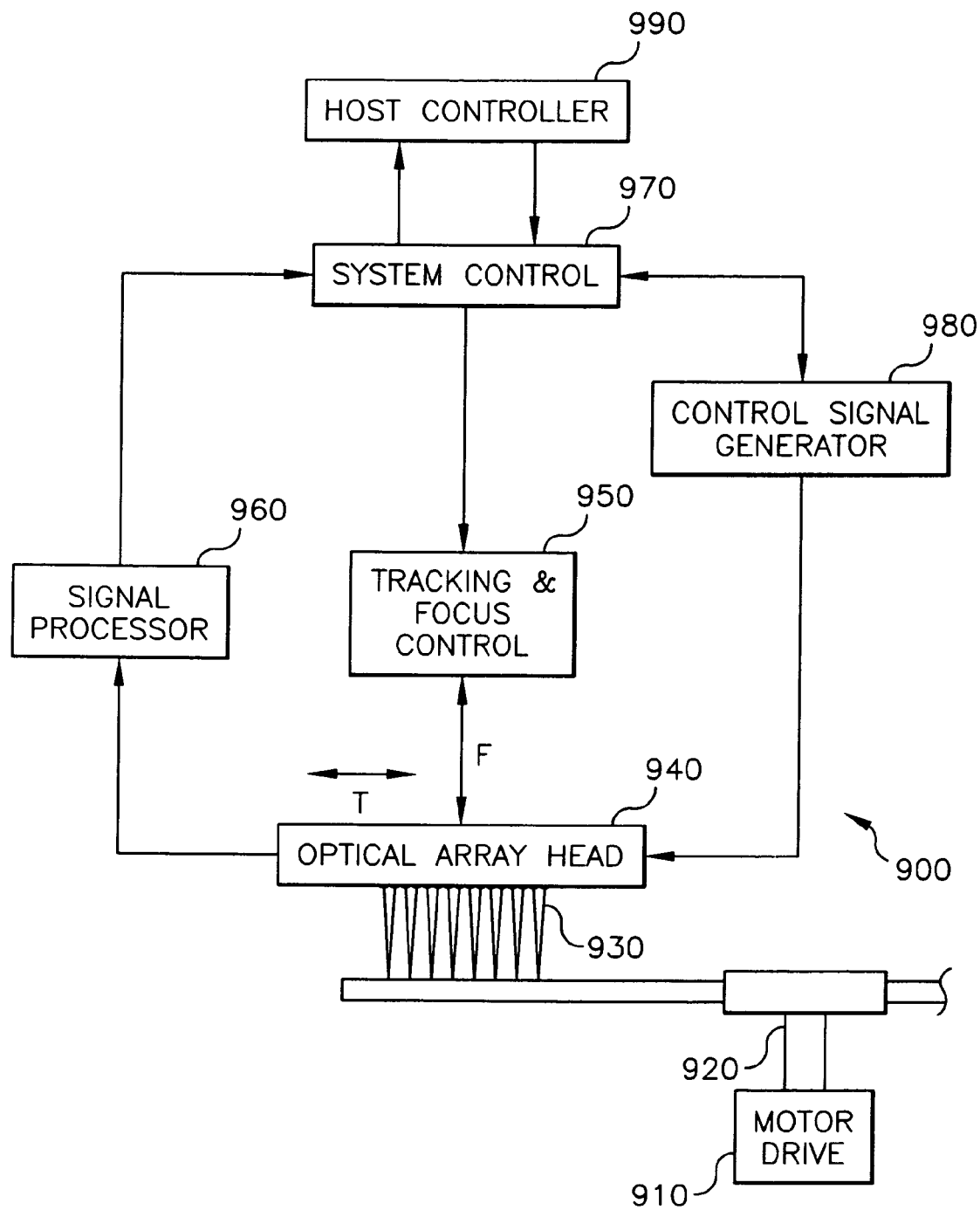
FIG. 14 is a block diagram of system components of the digital reading and writing system.

FIG. 14 is a block diagram 900 of system components of the digital reading and writing system. The various embodiments of the optical array head are depicted in block 940. Block 940 receives control signals from the control signal generator block 980; these signal are used to position the optical array head with respect to the medium 660. In this manner the light 930 incident upon and returned from the medium is properly focused and tracking within the data tracks is properly maintained. A motor drive 910 and spindle 920 moves the medium 660 with respect to the optical array head 940. The system also includes a system control block 970 that is in communication with the host controller block 990 of the system in which the digital read/write system is incorporated. A signal processor block 960 performs data and tracking signal analysis and processing and communicates directly with the system control block 970.

To read data from the medium 660, the host controller block 990 issues a request signal to the system control block 970. The system control block 970 issues a signal to the optical array head 940 to energize the organic vertical cavity laser devices in the optical array head 940. Energizing the elements of the organic vertical cavity laser array occurs via modulation of the pump beam light intensity. The incident light 930 is returned and sensed by the sensor of the optical array head and creates a modulated signal processed by the signal processor block. Data and tracking signals are extracted by the system control block 970 and communicated respectively with the host controller block 990 and tracking and focus control block 950. Data writing is accomplished in a similar fashion, but with higher optical power emitted by the organic vertical cavity laser array elements and without the extraction of the data signal by the system control block 970.

It is to be understood that various modifications and changes may be made without departing from the present invention, the present invention being defined by the following claims.

PARTS LIST

10 organic vertical cavity laser device
15 source
20 substrate
30 bottom dielectric stack
40 organic active region
50 top dielectric stack
56 objective lens
60 pump beam
70 laser emission
80 organic vertical cavity laser device
100 periodic gain region
103 antinode
105 node
110 organic spacer layers
120 standing electromagnetic field pattern
190 phase-locked organic laser array device
200 organic laser cavity device
210 inter-pixel regions
211 circular pillars
220 etched region
221 one-dimensional organic laser cavity structure
222 two-dimensional organic laser cavity structure 250 inter-pixel region
300 solid immersion optical lens
315 solid immersion lens portion
320 surface
330 boundary margin
335 read/write region
340 bottom surface
345 medium
348 optical rays
350 solid immersion lens array
355 glass spheres
360 glass spheres
365 connecting member
375 solid immersion lens
380 solid immersion lens
400 column
405 row
500 optical array head
505 data marks
510 medium
515 light
520 organic laser cavity structure
535 solid immersion lens array
530 beam splitter
535 stage
540 data tracks
545 light beam
550 sensor
560 optical array head
610 beamsplitter
620 emitted light
650 optical head subsystem
660 medium
670 modified top dielectric stack
690 filter
700 laser emission
710 reflected laser light
800 multi-head system
810 linear optical array head
820 two-dimensional optical array head
830 arrow
900 block diagram
910 motor drive
920 spindle
930 light
940 optical array head
950 block
960 block
970 block
980 block
990 block

What is claimed is:

1. A digital reader system for reading digital data recorded on a digital recording medium, comprising:
   a first array having a plurality of near-field solid immersion optical lenses;
   a second array having a plurality of organic micro-cavity lasers with the capability of light intensity modulation by an optical pump source, said first array being positioned with respect to said second array such that each near-field optical lens of said first array is associated with at least one organic micro-cavity laser in said second array, each of said plurality of organic micro-cavity lasers with the capability of light intensity modulation providing light to its associated near-field solid immersion optical lens that is used for reading digital data on said digital recording medium;
   an apparatus for modulation of the laser light beams; and
   a sensor for capturing reflected light from said medium that passes through said array of near-field optics so as to obtain said digital data from said digital recording medium.

2. A digital reader system according to claim 1 further comprising:
   a sensor for capturing reflected light from said medium that passes through said array of near-field optics so as to obtain tracking and focusing information from said digital recording medium.

3. The digital reader system according to claim 1 further comprising a third array having a plurality of organic micro-cavity lasers with the capability of light intensity modulation, said first array being positioned with respect to said third linear array such that each near-field solid immersion optical lens of said first array is associated with at least one micro-cavity laser in said third array, each of said plurality of organic micro-cavity lasers in said third array providing light to its associated near-field optical lens that is used for reading digital data on said digital recording medium, each of said lasers in said third array a produce light having wave length different than the wave length of said plurality of organic micro-cavity lasers of said second array.

4. The digital reader system according to claim 1 further comprising a third array having a plurality of organic micro-cavity lasers with the capability of light intensity modulation and a fourth array having a plurality of near-field solid immersion optical lens, said fourth array being positioned with respect to said third array such that each near-field optical lens of said fourth array is associated with at least one organic micro-cavity laser in said third array, each of said plurality of organic micro-cavity lasers in said third array providing light to its associated near-field optical lens that is used for reading digital data on said digital recording medium, said lasers in said third array are positioned with respect to said lasers in said second array so that they read different areas of said digital recording medium.

5. The digital reader system according to claim 3 wherein said lasers of said third array are axially offset with respect to said lasers in said second array.

6. The digital reader system according to claim 1 wherein said first array comprises a linear array and said second array comprises a linear array.

7. The digital reader system according to claim 1 wherein said first array comprises an area array and said second array comprises an area array.

8. The digital reader system according to claim 4 wherein said third array comprises a linear array and said fourth array comprises a linear array.

9. The digital reader system according to claim 1 wherein said third array comprises an area array and said fourth array comprises an area array.

10. A digital writer for writing digital data on a digital recording medium, comprising:
    a first array having a plurality of near-field solid immersion optical lenses;
    a second array having a plurality of organic micro-cavity lasers with the capability of light intensity modulation by an optical pump source, said first array being positioned with respect to said second array such that each near-field optical lens of said first array is associated with at least one micro-cavity laser in said second array, each of said plurality of organic micro-cavity lasers providing light to its associated near-field optical lens that is used for writing digital data on said digital recording medium;

an apparatus for modulation of the laser light beams; and a sensor for capturing reflected light from said medium that passes through said array of near-field optics so as to obtain tracking and focusing information from said digital recording medium.

11. The digital writer according to claim 10 wherein said first array comprises a linear array and said second array comprises a linear array.

12. The digital writer according to claim 10 wherein said first array comprises an area array and said second array comprises an area array.

13. A digital writer according to claim 10 wherein each of said plurality of first organic micro-cavity lasers of said second array is positioned adjacent its associated near-field solid immersion optical lenses in said first array.

14. The digital writer according to claim 10 further comprising a third linear array having a plurality of organic micro-cavity lasers with the capability of light intensity modulation, said first array being positioned with respect to said third array such that each near-field optical lens of said first array is associated with at least one micro-cavity laser in said third array, each of said plurality of organic micro-cavity lasers in said third array providing light to its associated near-field solid immersion optical lens that is used for writing digital data on said digital recording medium, each of said lasers in said third array a produce light having wave length different than the wave length of said plurality of organic micro-cavity lasers of said second linear array.

15. The digital writer according to claim 10 further comprising a third array having a plurality of organic micro-cavity lasers with the capability of light intensity modulation and a fourth array having a plurality of near-field solid immersion optical lens, said fourth array being positioned with respect to said third array such that each near-field optical lens of said fourth array is associated with at least one organic micro-cavity laser in said third array, each of said plurality of organic micro-cavity lasers in said third array providing light to its associated near-field optical lens that is used for writing digital data on said digital recording medium, said lasers in said third array are position with respect to said lasers in said second array so that they write on different areas of said digital recording medium.

16. The digital writer according to claim 13 wherein said lasers of said third array are axially offset with respect to said lasers in said second array.

17. The digital writer according to claim 13 further comprising a sensor for capturing reflected light from said medium that passes through said array of near-field optics so as to obtain tracking and focusing information from said digital recording medium.

18. A method for writing digital data on a digital recording medium, comprising the steps of:

providing a first array having a plurality of near-field solid immersion optical lenses;

providing a second array having a plurality of organic micro-cavity lasers that are modulated by an optical pump source, said first array being positioned with respect to said second array such that each near-field optical lens of said first array is associated with at least one of said plurality of micro-cavity lasers in said second array so that light emitting from said organic micro-cavity lasers will pass through its said associated near-field solid immersion optical lens for writing on said digital recording medium.

19. A method according to claim 18 further comprising the step of capturing reflected light from said medium that passes through said array of near-field optics so as to obtain tracking and focusing information from said digital recording medium.

20. A method according to claim 18 wherein a third array having plurality of organic micro-cavity lasers is provided, said plurality lasers of said second linear array of organic micro-cavity lasers having a wave length different than said plurality of micro-cavity lasers of said third array.

21. A method according to claim 18 wherein said third array of is positioned with respect to said second array such that the organic micro-cavity lasers of said third array write at a location on said digital recording medium different from the location said plurality of organic micro-cavity said second array write on said digital recording medium.

* * * * *